/ 
United States Patent Office 3,437,287
Patented Apr. 8, 1969

3,437,287
MEANS FOR SECURING EASILY DETACHABLE SHIELDS TO AEROSPACE VEHICLES
Calvin M. Dolan, King of Prussia, Pa., assignor to General Electric Company, a corporation of New York
No Drawing. Filed Dec. 22, 1966, Ser. No. 603,782
Int. Cl. B64c 1/00; B32b 31/00; C09j
U.S. Cl. 244—1                                    4 Claims

ABSTRACT OF THE DISCLOSURE

An interposed layer of a metal easily dissolved by mercury, such as tin, in a conventional bond structure between an aerospace vehicle outer surface and a shield therefor, facilitates removal of the shield from the vehicle. A small amount of mercury, contacting an exposed edge of the tin layer for example, amalgamates the tin and separates the shield from the vehicle surface.

Background of the invention

This invention relates to a means for securing an outer shield to an aerospace vehicle, which means facilitates removal and replacement of the shield.

With the advent of reusable aerospace vehicles, a need has developed for refurbishing outer shield materials on these vehicles between flights. One example is the thermal shielding on the X-15 experimental aircraft which, during extremely high performance flights, will be partially consumed. Replacement of the shielding will be required for subsequent missions. Many approaches have been utilized in attempts to develop practical easily detachable and replaceable shields. "Loop and pile" construction, perforated interface, and expandable gaskets are among the attaching means which have been investigated for this purpose.

Summary of the invention

It is therefore the generalized object of the present invention to provide a means for securing shields and shield materials to aerospace vehicles in such a way that these shields and shield materials can be easily removed and replaced and the vehicle, thus refurbished, prepared for subsequent use.

This and other related objects are met in accordance with the present invention, by the inclusion of a layer of a metal easily dissolved by mercury, such as tin, interposed between the bond surface of the shield and the aerospace vehicle, in an otherwise conventional means for bonding a shield to an aerospace vehicle. The conventional bonding means may comprise, for example, a ceramic, metallic, or organic bonding agent. For practical reasons, the interposed metal layer is generally formed as an outer coating on the vehicle surface. When removal or refurbishment of the assembly is required, the old shield can be removed by contacting the edge of the bond line with mercury which amalgamates with the interposed metal layer along the entire bond line and separates the shield from the aerospace vehicle surface. A new shield may then be attached to the vehicle surface.

Detailed description of the invention

While the specification concludes with claims particularly pointing out and distinctly claiming the subject matter of the present invention, this invention may be better understood from the following detailed description:

To demonstrate the practicability of the present invention a sheet of tin-plated steel, representing the metallic outer surface of an aerospace vehicle with an outer coating of tin, has been bonded using conventional bonding techniques, with a room temperature vulcanizing silicon elastomer as the bonding agent, to several samples of ESM-1000 thermal shield material. ESM-1000 is the commercial designation of a shield material, comprising a room temperature vulcanizing, foamed silicon with a char-retention additive, developed by the General Electric Company. A drop of mercury was placed at the edge of the bond line of some of the shield-metal joint structures. Amalgamation of the tin occured along the entire bond line or interface almost immediately. The small amount of mercury seemed to spread along the interface by capillary action. The shield materials were then lifted off the tin-plated steel surface intact and the steel surface, wiped clean, was ready to be re-coated with tin and reattached to the shield material. The samples which had not been contacted with mercury remained firmly attached.

It will be appreciated that while the dissolution of tin in mercury, or the amalgamation of tin, is a well known process, it is the utilization of this process and, specifically, its application to the problems in the art to which this invention pertains, which are the central features of the present invention.

This application of the process is highly practical because of the simplicity of the process and because of the ease with which a new shield may be attached, even in the field. Processes for applying a tin outer coating in the field, by brushing on a chemical solution for example, are well known. Thus, when a spent shield has been removed and the vehicle surface wiped clean, a tin coating may be applied to the vehicle surface in the field and a new shield attached.

Obviously, other metals which are easily dissolved by mercury may be used in place of tin. In particular, alloys having a high tin content may be suitable tin substitutes for purposes of the present invention.

What I claim as new and desire to secure by Letters Patent of the United States is:

1. An assembly comprising an aerospace vehicle surface, a shield therefor, means to secure said shield to said surface, and means for conveniently detaching said shield from said surface, said last named means comprising a thin layer of a metal easily dissolved by mercury interposed between said securing means and said shield.
2. An assembly, as recited in claim 1, wherein said metal is an alloy having a high tin content.
3. An assembly, as recited in claim 1, wherein said metal is tin.
4. Method for attaching and detaching a shield from an aerospace vehicle comprising first forming a tin coating on the surface of the vehicle to be shielded, bonding said shield to said surface, and, when detachment is required, contacting the edge of said bond surface with mercury, whereby said tin is amalgamated and said shield is released from said surface.

References Cited

UNITED STATES PATENTS 3,187,423    6/1965    Lantz _____ 29—427

FERGUS S. MIDDLETON, *Primary Examiner.*

U.S. Cl. X.R.

29—427; 156—247